United States Patent
Weber

(10) Patent No.: US 12,233,925 B2
(45) Date of Patent: Feb. 25, 2025

(54) METHOD FOR THE CONFIGURATION OF CONTROL SOFTWARE IN A RAIL VEHICLE

(71) Applicant: Siemens Mobility GmbH, Munich (DE)

(72) Inventor: Matthias Alexander Weber, Uttenreuth (DE)

(73) Assignee: Siemens Mobility GmbH, Munich (DE)

( * ) Notice: Subject to any disclaimer, the term of this patent is extended or adjusted under 35 U.S.C. 154(b) by 27 days.

(21) Appl. No.: 18/548,138

(22) PCT Filed: Feb. 23, 2022

(86) PCT No.: PCT/EP2022/054483
§ 371 (c)(1),
(2) Date: Aug. 28, 2023

(87) PCT Pub. No.: WO2022/180073
PCT Pub. Date: Sep. 1, 2022

(65) Prior Publication Data
US 2024/0034375 A1  Feb. 1, 2024

(30) Foreign Application Priority Data
Feb. 26, 2021 (DE) ...................... 10 2021 201 830.0

(51) Int. Cl.
*B61L 27/57* (2022.01)
*B61L 27/60* (2022.01)

(52) U.S. Cl.
CPC ............... *B61L 27/57* (2022.01); *B61L 27/60* (2022.01)

(58) Field of Classification Search
CPC .................................. B61L 27/50; B61L 27/57
See application file for complete search history.

(56) References Cited

U.S. PATENT DOCUMENTS

| 8,561,054 B2 | 10/2013 | Smirnov et al. |
| 9,600,266 B2 | 3/2017 | Molin et al. |

(Continued)

FOREIGN PATENT DOCUMENTS

| DE | 102004049297 A1 | 4/2006 |
| DE | 102006052048 A1 | 5/2008 |

(Continued)

OTHER PUBLICATIONS

Marc Behrens et al, "Testen in der modellbasierten Entwicklung der ETCS-On-Board-Unit Testing during the model-based development of the ETCS on-board unit", Signal Und Draht: Signalling & DATACOMMUNICATION, Band 108, No. 7+Aug. 2016, Jul. 1, 2016 (Jul. 1, 2016), p. 21-28, XP055299915, ISSN:0037-4997, the whole document.

*Primary Examiner* — Adam D Tissot
(74) *Attorney, Agent, or Firm* — Laurence A. Greenberg; Werner H. Stemer; Ralph E. Locher

(57) ABSTRACT

A method for configuring control software in a rail vehicle. The control software, which is designed for a multitude of rail vehicles, implements basic functions that are required for the basic operation of the rail vehicles. The control software additionally implements optional functions required to execute client-specific requests. The specifications, combinations and functional sequences of the basic functions and optional functions are tested, validated, and approved before the functions are implemented in the rail vehicles, whereupon the basic functions and optional functions are made available in the rail vehicles. In a selected rail vehicle, at least one optional function is activated or deactivated using a switching parameter that is individually allocated to the optional function. The switching parameter required therefor is established outside the rail vehicle and is then transmitted to the selected rail vehicle.

16 Claims, 4 Drawing Sheets

(56) References Cited

U.S. PATENT DOCUMENTS

| | | |
|---|---|---|
| 10,229,036 B2 | 3/2019 | Braband |
| 10,402,184 B2 | 9/2019 | Rockwell et al. |
| 11,613,285 B2 | 3/2023 | Lohneis |
| 2002/0065698 A1* | 5/2002 | Schick ................. G07C 5/0841 |
| | | 705/333 |
| 2012/0072055 A1 | 3/2012 | Barlsen et al. |
| 2019/0106137 A1* | 4/2019 | Shubs, Jr. ........... B61L 15/0058 |

FOREIGN PATENT DOCUMENTS

| | | |
|---|---|---|
| DE | 102007051440 A1 | 4/2009 |
| DE | 102009018761 A1 | 10/2010 |
| DE | 102009022362 A1 | 11/2010 |
| DE | 112012007197 T5 | 8/2015 |
| DE | 102015107189 A1 | 11/2015 |
| DE | 102017212109 A1 | 1/2019 |
| EP | 3027483 B1 | 5/2020 |

\* cited by examiner

METHOD FOR THE CONFIGURATION OF CONTROL SOFTWARE IN A RAIL VEHICLE

FIELD AND BACKGROUND OF THE INVENTION

The invention relates to a method for configuring control software in a rail vehicle which is preferably already in operation.

The behavior of a rail vehicle is determined using vehicle software or control software. This has been specially developed for a rail vehicle type and is comprehensibly referred to, tested and approved as a software release for this rail vehicle type.

The software is installed on the rail vehicle before or during delivery of the latter and, upon delivery to a customer, is a fixed part of the rail vehicle.

Modifications or adaptations of the software which are desired by the customer require cost-intensive redevelopment or supplementation of the software with subsequent renewed testing and approval together with activation of the software in the customer's rail vehicle.

Accordingly modified vehicle or control software is "installed" on the respective rail vehicle after approval in situ and with the aid of service personnel and is installed in the corresponding programmable components.

Depending on the extent of the software modification, a so-called non-regression test must be carried out in a suitable test infrastructure after startup.

This method for modifying software is time-consuming, personnel-intensive and cost-intensive.

SUMMARY OF THE INVENTION

Therefore, the object of the present invention is to specify an improved method for adapting or configuring vehicle or control software in a rail vehicle.

This object is achieved by means of the claimed invention. Advantageous developments are specified in the dependent claims.

The invention relates to a method for configuring vehicle software or control software in a rail vehicle and to a rail vehicle having control software.

According to the invention, in addition to basic functions, further functions are additionally included in the software, which further functions can be optionally activated and/or deactivated and can be used to address customer-specific requirements or a customer-specific requirements profile in a manner specific to the individual vehicle.

In this case, the basic functions describe the software components, for example functions, which are needed for the basic operation of the rail vehicle and
relate to the drive and its control,
relate to the brakes and their control,
etc.

In this case, the optional functions describe functions which can be selected and influenced even after delivery of the rail vehicle according to customer requirements or the customer-specific requirements profile. These are, for example, an activatable and deactivatable function
which relates to an operating mode "Washing journey of the rail vehicle" or enables and addresses this operating mode,
which enables or relates to an adjustment or specification of a maximum speed of the rail vehicle,
which enables or relates to unlocking of specific increases in the performance of the rail vehicle,
which enables or relates to unlocking of a driver assistance system,
etc.

The embodiments, combinations and functional sequences of the basic functions and the optional functions are tested, validated and approved before implementation in the rail vehicle by the manufacturer or by appointed entities.

The important factor in this context is that the basic functions and the optional functions are approved in a manner specific to the vehicle type and individual vehicle, whereas the optional functions can be additionally activated and/or deactivated in a manner specific to the individual vehicle.

The optional functions are activated and/or deactivated by means of individually assigned parameters and, if necessary, their sequence or result is influenced by means of parameters that have been set.

These parameters are referred to below as switching parameters and are in the form of value parameters or parameter fields.

An assigned optional function is activated and/or deactivated with the aid of a value parameter, whereas, in addition to activating and/or deactivating an assigned optional function, its internal sequence is additionally influenced with the aid of a parameter field.

In one advantageous development, the contents of the switching parameters are selected or determined by the manufacturer or the sales department of the rail vehicle. This enables intelligent fleet management in which selected rail vehicles are adapted to specific tasks according to customer specifications or according to the specification of a customer-specific requirements profile.

In one advantageous development, the switching parameters are determined using software-supported tools which allow the sales staff, for example, to select permissible switching parameters for corresponding functions, to fill them as a switching parameter set and to store them.

In one advantageous development, the switching parameters are stored in the form of a file which can be directly processed by control devices of the rail vehicle.

In one advantageous development, the file containing the switching parameters is encrypted in a manner specific to the individual vehicle in order to prevent unauthorized manipulations and to prevent copying of the file.

In one advantageous development, the file containing the switching parameters is transmitted via a communication channel for implementation in the rail vehicle.

The transmission is either directed to a service engineer who receives the file via email or via a cloud-based data transmission, for example, or the file transmission is directed directly to the affected rail vehicle which receives the file and whose control devices then preferably automatically implement the file.

In one preferred development, the file containing the switching parameters is transmitted in encrypted form in order to prevent falsifications, transmission errors and/or security attacks. A public key method, for example, is used for this purpose.

In one advantageous development, the file containing the switching parameters is buffered on a computer of the rail vehicle. This is used to document the status of the software and forms a fallback solution that is used to increase vehicle safety.

In one advantageous development, the entire control technology of a rail vehicle in question, which control technology comprises a plurality of control devices for parameterization, is addressed and/or influenced using the file. Precisely one file containing switching parameters is then created for each rail vehicle and is used in the rail vehicle, the contents of which file are distributed among the associated control devices. This minimizes necessary handling effort.

In one advantageous development, during restarting or starting up ("booting"), the control devices inquire, at a central entity of the rail vehicle or a landside control station, whether there are new switching parameters for the associated rail vehicle.

In one advantageous development, this inquiry is coordinated with the aid of a changeover manager in order to prevent uncoordinated activation of the switching parameters in the associated functions and to enable reliable activation and/or deactivation of the optional functions with regard to temporal sequences.

In one preferred development, the changeover manager uses a message for forming fingerprints of a currently used switching parameter set and a newly received switching parameter set.

A "Message-Digest Algorithm 5, MD5" method or a CRC method, which can be used to uniquely identify the contents of a switching parameter set, comes into consideration for forming the fingerprints, for example.

The fingerprints are transmitted, together with an associated receipt date, to the central entity. This entity then selects, as a valid switching parameter set, that switching parameter set whose fingerprint is the same across all control devices and has the most recent receipt date, and transmits the decision to the control device of the rail vehicle or to the associated control devices.

In one preferred development, the optional function is activated and/or deactivated in a safe state of the rail vehicle, preferably at a standstill and/or in a predefined vehicle environment. When the control devices are restarted, the new switching parameter set is then loaded in order to make available the configured range of functions of the vehicle or control software.

In one preferred development, a traction vehicle driver of the rail vehicle receives a message indicating that the range of functions of the software has been modified and/or configured.

A veto right is preferably granted to the traction vehicle driver, so that the driver can accept or reject the software configuration.

A rejection decision is preferably obtained once and is then deemed to be a permanent rejection, that is to say a rejection decision is retained even if the control devices are restarted in future.

Alternatively, the decision by the traction vehicle driver is requested again each time the control devices of the vehicle are restarted.

In one preferred development, a list of the activated optional functions and of the associated parameters is displayed to a traction vehicle driver of the rail vehicle on a display.

It is not possible for the traction vehicle driver to influence the optional functions which have been set. This task is preferably the responsibility of the fleet management.

In one preferred development, a previous switching parameter set remains valid or active if not all control devices consistently adopt the new switching parameter set.

In one preferred development, a restart of the control devices of the control technology is initialized if a control device is replaced or a control device is removed from the group, in order to ensure the adoption of currently valid switching parameters.

The method according to the invention makes it possible for the sales department, the manufacturer and/or the fleet management of a rail vehicle to subsequently activate functions which are desired or required by the customer in vehicles that have already been delivered, without having to involve technical specialist departments.

The method according to the invention makes it possible for the sales department, the manufacturer and/or the fleet management of a rail vehicle to subsequently configure the control software in vehicles that have already been delivered in a predetermined framework and with a quick response.

By virtue of the method according to the invention, the software configuration can be carried out or is enabled either by means of service personnel in situ or using remote data transmission.

The software configuration can be reliably carried out both in terms of functional aspects and in terms of safety aspects by virtue of the method according to the invention.

The method according to the invention makes it possible to react to customer requirements considerably more quickly by setting predefined parameters in functions and activating functions that have already been approved.

The method according to the invention reduces costs since a software configuration can be carried out directly, that is to say without involving subsequent engineering services, and without subsequently validating the software or re-approving the software.

The method according to the invention at least reduces or completely avoids previously required non-regression tests in a test infrastructure required for this purpose.

BRIEF DESCRIPTION OF THE FIGURES

The invention is explained, by way of example, in more detail below with reference to a drawing, in which.

DETAILED DESCRIPTION OF THE INVENTION

Figure 1:
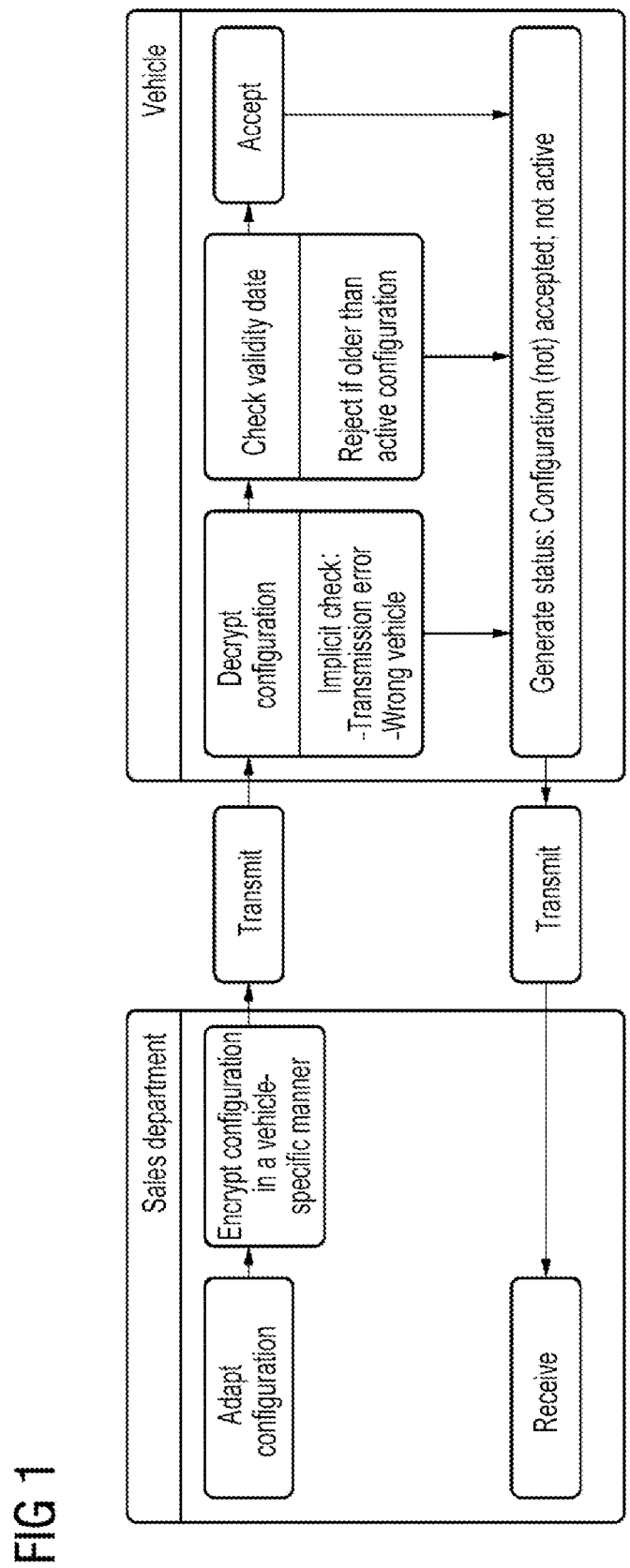
FIG. 1 shows a self-explanatory illustration of a software configuration formed by the sales department and its implementation by a vehicle or rail vehicle according to the present invention.
Figure 2:
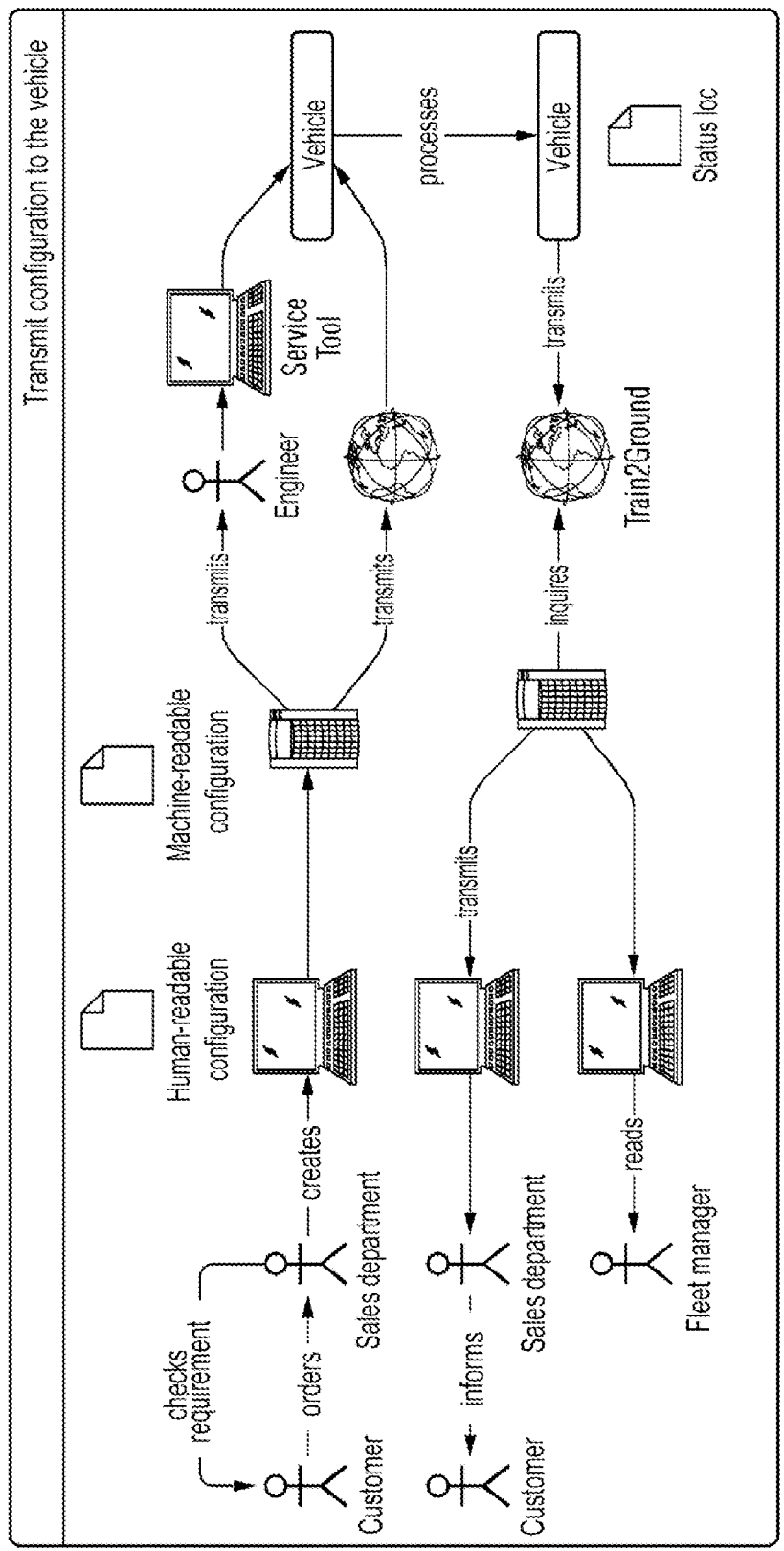
FIG. 2 shows a self-explanatory illustration of the interaction between customers, the sales department and the vehicle or rail vehicle according to the present invention.
Figure 3:
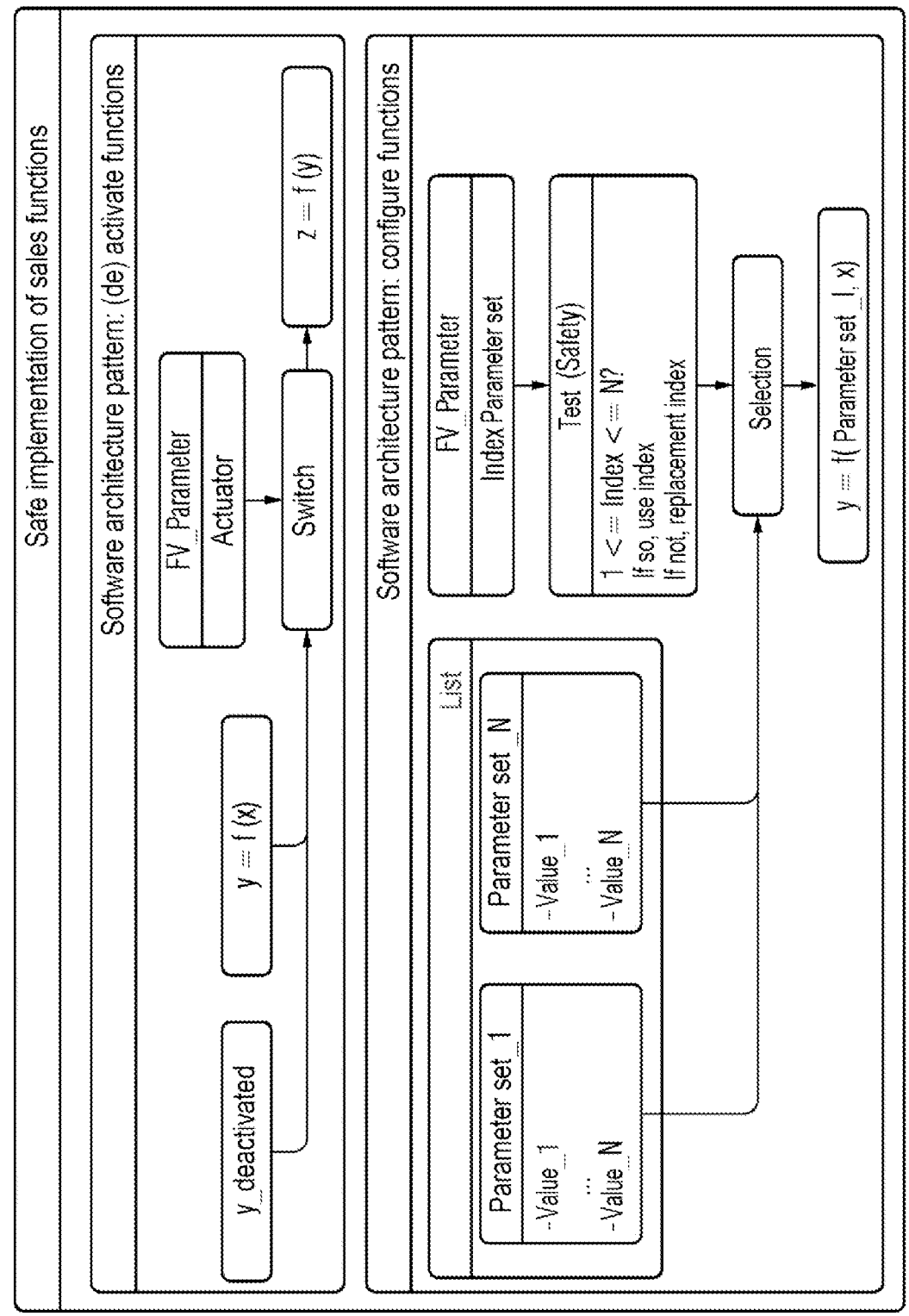
FIG. 3 shows a self-explanatory configuration of the activation and/or deactivation of an optional function according to the present invention.
Figure 4:
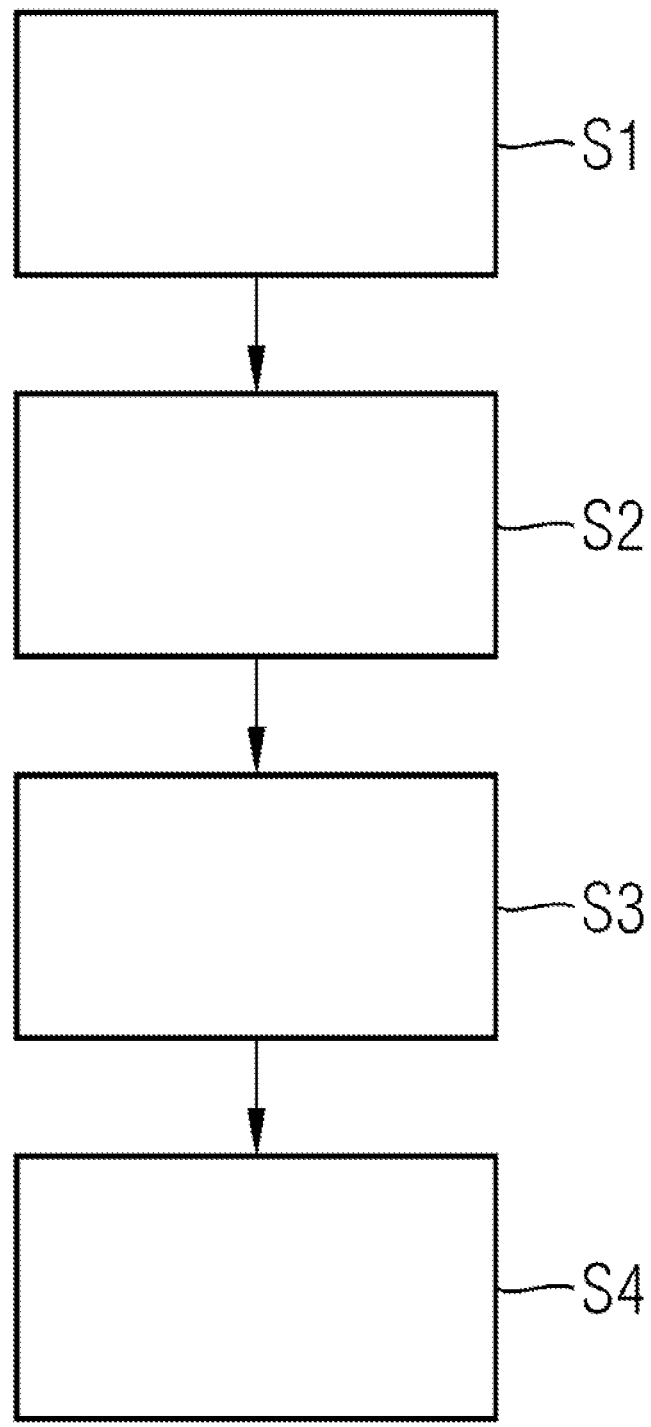
FIG. 4 shows an overall view of the present invention using a flowchart.

In a first step S1, basic functions which are needed for the basic operation of the rail vehicles are implemented in control software intended for a multiplicity of rail vehicles. Optional functions which are needed to implement a customer-specific requirements are implemented in the control software.

In a second step S2, the embodiments, combinations and functional sequences of the basic functions and the optional functions are tested, validated and approved before the control software is implemented in the rail vehicles by the manufacturer or by appointed entities.

In a third step S3, the basic functions and the optional functions are implemented as control software in the rail vehicles.

In a fourth step S4, at least one optional function is activated and/or deactivated in a selected rail vehicle using a switching parameter individually assigned to the optional function.

The required switching parameter is created outside the rail vehicle on the basis of customer requirements and is subsequently transmitted to the selected rail vehicle.

The optional function is activated and/or deactivated in a rail vehicle which is in operation.

The switching parameter is determined using software-supported tools which allow only a permissible switching parameter selection for corresponding functions.

Switching parameters are stored individually or in the form of a file which can be directly processed by control devices of the selected rail vehicle.

The switching parameters are encrypted, with the result that decryption can be carried out solely by the selected rail vehicle.

The switching parameters are transmitted, via a communication channel, to a service engineer who updates the control software in the selected rail vehicle, or are transmitted directly to the selected rail vehicle, wherein its control devices automatically implement them in the control software.

During activation, the control devices of the rail vehicle inquire, at a central entity of the rail vehicle or at a landside control station, whether there are new switching parameters for the associated rail vehicle.

The inquiry is coordinated with the aid of a changeover manager in order to enable coordinated activation and/or deactivation of optional functions or of the switching parameters in associated optional functions.

The optional function is activated and/or deactivated in a safe state of the rail vehicle, preferably at a standstill or in a predefined vehicle environment.

A veto right is granted to the traction vehicle driver of the rail vehicle in order to reject a control software configuration with respect to the optional function.

The invention claimed is:

1. A method for enabling control software in a rail vehicle to be modified, the method which comprises:
providing a rail vehicle with control software stored in a non-transitory storage medium on the rail vehicle, wherein the control software has basic functions that are needed for a basic operation of any of a multiplicity of rail vehicles, the basic functions being functions relating to a drive of the rail vehicle, to controlling the drive of the rail vehicle, to brakes of the rail vehicle, and to controlling the brakes of the rail vehicle;
wherein the control software has optional functions that are needed to implement a multiplicity of customer-specific requirement profiles, wherein the optional functions are functions other than the basic functions;
wherein embodiments, combinations, and functional sequences of the basic functions and of the optional functions were tested, validated, and approved before implementing the control software in the rail vehicle; and
in a selected one of the rail vehicles, enabling the control software to be modified based on a switching parameter that is individually assigned to one of the optional functions of the control software, wherein the switching parameter determines whether the one of the optional functions of the control software is activated or deactivated and thus whether the one of the optional functions of the control software is included in a range of functions of the control software;
wherein the switching parameter is determined and generated by a manufacturer of the rail vehicles remotely from the selected one of the rail vehicles on a basis of a special customer-specific requirement profile; and
wherein the switching parameter is transmitted via a communication channel
and via an interface to a service engineer who updates the control software in the selected one of the rail vehicles; or
directly to the selected one of the rail vehicles, wherein control devices in the selected one of the rail vehicles automatically implement the switching in the control software.

2. The method according to claim 1, which comprises activating and/or deactivating the one of the optional functions of the control software in the selected one of the rail vehicles while the selected one of the rail vehicles is in operation.

3. The method according to claim 1, which comprises determining the switching parameter using software-supported tools which allow only a permissible switching parameter selection for corresponding functions.

4. The method according to claim 1, which comprises storing the switching parameter or a plurality of switching parameters individually or in a form of a file which can be directly processed by control devices of the selected one of the rail vehicles.

5. The method according to claim 4, which comprises encrypting the switching parameter to thereby allow a decryption to be carried out solely by the selected one of the rail vehicles.

6. The method according to claim 1, which comprises, during an activation, inquiring with control devices of the selected one of the rail vehicles at a central entity of the selected one of the rail vehicles or at a landside control station, whether there are new switching parameters available for the selected one of the rail vehicles.

7. The method according to claim 6, which comprises coordinating the inquiry with a changeover manager in order to enable coordinated activation and/or deactivation of the optional functions of the control software or of the switching parameters in associated optional functions.

8. The method according to claim 1, which comprises activating and/or deactivating the one of the optional functions of the control software in a safe state of the selected one of the rail vehicles.

9. The method according to claim 8, which comprises activating and/or deactivating the one of the optional functions of the control software at a standstill of the selected one of the rail vehicles or in a predefined vehicle environment.

10. The method according to claim 1, which comprises granting a veto right to a traction vehicle driver of the selected one of the rail vehicles in order to selectively reject a control software configuration with respect to the one of the optional functions of the control software.

11. A vehicle, comprising:
a rail vehicle having a non-transitory storage medium with control software stored therein, the control software configured for implementation in a multiplicity of rail vehicles;
said control software having basic functions for a basic operation of the rail vehicle, and optional functions intended to implement a multiplicity of customer specific requirement profiles, the basic functions being functions relating to a drive of the rail vehicle, to controlling the drive of the rail vehicle, to brakes of the rail vehicle, and to controlling the brakes of the rail vehicle, and the optional functions being functions other than the basic functions;

wherein the embodiments, combinations and functional sequences of the basic functions and the optional functions of the control software have been tested, validated and approved before an implementation of the control software in the rail vehicle;

wherein the control software is enabled to be modified based on a switching parameter individually assigned to one of the optional functions of the control software, wherein the switching parameter determines whether the one of the optional functions of the control software is activated or deactivated and thus whether the one of the optional functions of the control software is included in a range of functions of the control software;

wherein the switching parameter required for activating and/or deactivating the one of the optional functions of the control software is determined by a manufacturer of the rail vehicle and created outside the rail vehicle on a basis of a special customer-specific requirement profile; and wherein the switching parameters are transmittable via a communication channel —and via an interface to a service engineer who updates the control software in the rail vehicle; or directly to the rail vehicle, wherein control devices of the rail vehicle automatically implement the switching parameters in the control software.

12. The vehicle according to claim 11, wherein the one of the optional functions of the control software can be activated and/or deactivated in the rail vehicle which is in operation.

13. The vehicle according to claim 11, wherein the switching parameter is determined using software-supported tools which allow only a permissible switching parameter selection for corresponding functions.

14. The vehicle according to claim 11, wherein switching parameters are stored individually or in a form of a file which can be directly processed by control devices of the rail vehicle.

15. The vehicle according to claim 14, wherein the switching parameters are encrypted to allow a decryption thereof solely by the rail vehicle.

16. The vehicle according to claim 11, wherein control devices of the rail vehicle are switched during activation to inquire, at a central entity of the rail vehicle or at a landside control station, whether there are new switching parameters available for the rail vehicle.

* * * * *